UNITED STATES PATENT OFFICE.

VERNON A. WHITE, OF CHICAGO, ILLINOIS.

FOOD PRODUCT AND PROCESS OF MANUFACTURE.

1,382,038. Specification of Letters Patent. Patented June 21, 1921.

No Drawing. Application filed April 29, 1920. Serial No. 377,454.

*To all whom it may concern:*

Be it known that I, VERNON A. WHITE, a citizen of the United States, and a resident of the city of Chicago, in the county of Cook and State of Illinois, have invented certain new and useful Improvements in Food Products and Processes of Manufacture; and I do hereby declare that the following is a full, clear, and exact description of the same.

This invention relates to food products and process of manufacture.

Certain food products, such as cocoanut, are very apt to become rancid after keeping only a short while, and this applies more to cocoanuts from South America than those from Ceylon which are firmer and have less rancidity producing constituents.

One of the principal objects of the invention is to provide means for keeping food products such as cocoanut sweet.

Another object of the invention is to provide an improved cocoanut product.

A further object of the invention is to provide a process for treating food products such as cocoanut to prevent their turning rancid.

It is also an object to provide means for peripherally coloring particles of cocoanut.

The invention also has other important objects which will appear from the following specification.

I have found that the tendency to rancidity can be greatly reduced if the particles of cocoanut are separated from each other so as to prevent the spread of fungi, bacteria, enzyms and other deteriorating agents.

Further, I have found that if the particles are also suitably coated so as to prevent entry of living agents such as fungus spores, bacteria and the like as well as exclude atmospheric oxygen, the material will keep for an almost indefinite period.

The coating is preferably one which will not be tacky so that the particles will not adhere to each other. A powder, such as rice, wheat or other starch, may be used to advantage. Preferably, however, the adhesiveness of the particles of cocoanut for such powder is increased by first coating the particles with a suitable liquid such as glycerin or syrup. Glycerin is very suitable as it is sweet to the taste, substantially non-volatile and very viscous. Another advantage possessed by glycerin is its power as a solvent which enables suitable coal tar or vegetable colors to be dissolved therein for the purpose of giving the product its desired color.

As an example of suitable coloring matter a mixture of tartrazin with amaranth may be mentioned as these colors give a good yellow so that the resulting product looks like an egg custard.

With the glycerin may also be mixed a suitable flavoring extract such as vanilla or vanillin.

According to the preferred form of my invention, fine cut cocoanut is sprayed with glycerin containing coloring matter and flavoring extracts therein and then the particles are coated with flour.

The resulting product has a fluffy, delicate appearance and does not cake or turn rancid. It may be used as a pudding, pie filling or for other purposes by adding sugar and milk and heating for several minutes until the whole mass has thickened.

While I have described my invention in a preferred form, I am aware that various changes and modifications may be made therein without departing from the principles of my invention, and I therefore do not purpose limiting the patent granted hereon otherwise than necessitated by the prior art.

I claim as my invention:

1. A process of making preserved cocoanut particles including coating the particles with a powdery substance in the absence of heat whereby adhesion between the particles is prevented.

2. A process of treating cocoanut particles including coating the particels with a solution of a coloring substance.

3. A process of treating cocoanut particles including first coating the particles with glycerin containing a coloring substance and then covering the coated particles with starch whereby adhesion between the particles is prevented.

4. A process of treating cocoanut particles including first coating the particles with a substantially non-volatile liquid and then covering the coated particles with starch whereby adhesion between the particles is prevented.

5. A process of treating cocoanut particles including first coating the particles with a viscous liquid and then covering the coated particles with a powdery substance whereby adhesion between the particles is prevented.

6. A process of treating cocoanut particles including first coating the particles with glycerin containing a flavoring extract and then covering the coated particles with flour whereby adhesion between the particles is prevented.

7. A process of treating food particles including first coating the particles with a liquid and then covering the coated particles with a powdery substance whereby adhesion between the particles is prevented.

8. A process of treating food particles including first coating the particles with glycerin and then covering the coated particles with a powdery substance whereby adhesion between the particles is prevented.

9. A process of treating food particles, including covering the particles in the absence of heat with a coating comprising a viscous liquid and a powdery substance whereby adhesion between the particles is prevented.

10. A process of treating food particles, including covering the particles in the absence of heat with a coating comprising a viscous liquid, a flavoring extract, and a powdery substance.

11. A process of treating food particles, including covering the particles in the absence of heat with a coating comprising a viscous liquid, coloring matter, a flavoring extract, and a powdery substance.

In testimony whereof I have hereunto subscribed my name in the presence of two subscribing witnesses.

VERNON A. WHITE.

Witnesses:
  CARLTON HILL,
  EARL M. HARDINE.